Oct. 14, 1930.                E. C. MARBURG                1,778,083
                            PRODUCING ALUMINA
                            Filed Oct. 20, 1925
Diagram Illustrating The Process For Producing Alumina From Clay And Hydrochloric Acid According To U.S. Patent 1 519 880. Modified By Present Invention
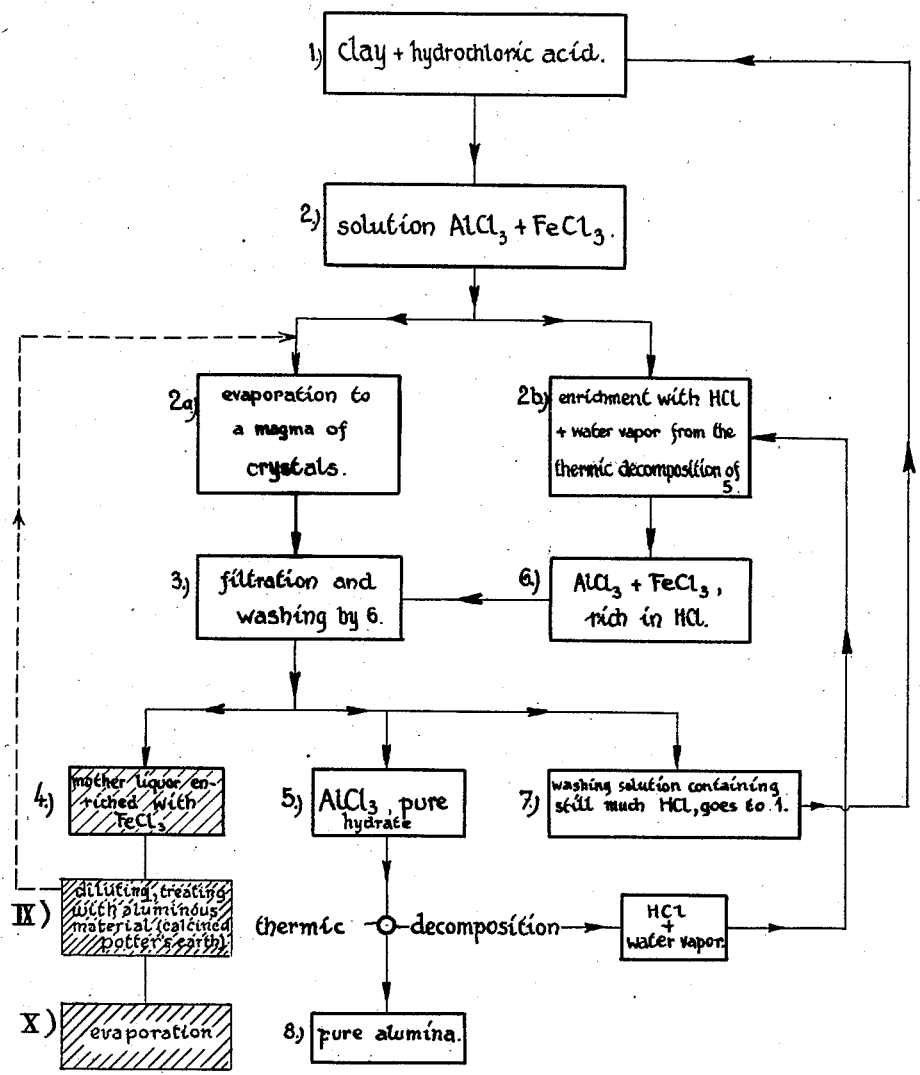
Inventor:
Eduard C. Marburg
by
Paul Ferkhand
Attorney Patented Oct. 14, 1930

1,778,083

UNITED STATES PATENT OFFICE

EDUARD CARL MARBURG, DECEASED, LATE OF GRIESHEIM-ON-THE-MAIN, GERMANY, BY ANNA MARBURG, ADMINISTRATRIX, OF GRIESHEIM-ON-THE-MAIN, GERMANY, ASSIGNOR TO I. G. FARBENINDUSTRIE AKTIENGESELLSCHAFT, OF FRANKFORT, GERMANY

PRODUCING ALUMINA

Application filed October 20, 1925, Serial No. 63,688, and in Germany October 2, 1924.

This invention relates to a process of producing alumina from aluminous raw materials as described in U. S. Patent 1,519,880 which substantially consists in treating the aluminous raw material with hydrochloric acid, evaporating part of the resulting solution so as to cause aluminum chloride which is practically free from iron to crystallize while a mother liquor comparatively rich in iron is left behind, and finally decomposing the aluminum chloride thus obtained, by the action of heat, into hydrochloric acid and alumina, said hydrochloric acid gas being further utilized to enrich the remaining part of the original solution which is then employed for washing the crystals of aluminum chloride intermediarily obtained.

These mother liquors, or washing solutions, naturally contain comparatively large quantities of ferric chloride in proportion to the aluminum chloride present. With regard to the further treatment of such mother liquors, it has hitherto been the practice to decompose the said liquors by heat in order to recover the hydrochloric acid. The alumina thus obtained which contains a large percentage of iron may then be refined by the rather complex process usually employed for the production of alumina from bauxite.

Now I have found that these waste liquors may be utilized in a far more advantageous manner by causing them to react with materials containing alumina under such conditions of concentration as promote the occurrence of the reaction known per se which is represented by the following:

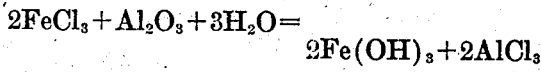
$$2FeCl_3 + Al_2O_3 + 3H_2O = 2Fe(OH)_3 + 2AlCl_3$$

It thus appears as the main object of the present invention to provide an improved method for utilizing the mother liquors comparatively rich in iron contents and incidentally to increase the total yield of pure alumina obtained by the main process.

For carrying out the improved process according to the aforementioned reaction, alumina proper, bauxite, kaolin, or any other material containing alumina, may be employed; I preferably employ calcine clay, this being the same raw material as is subjected to extraction in the main process.

In this manner not only are the iron salts separated from the remaining mother liquor, but at the same time their equivalent in form of alumina—which is also the object of the main process—is obtained in form of a solution. A further advantage of this procedure is that it is not indispensable to employ the aluminous material in a finely disintegrated form. A preferable mode of carrying my invention into practice, for instance, consists in filtering the hot mother liquors rich in iron through a large excess of granulated aluminous material, and, after the reaction is completed, separating the ferric oxide precipitated on the granulated medium from the latter by a stream of washing water. The granulated residue containing a slightly diminished percentage of alumina is then preferably added to the clay to be subjected to the main process.

For better comprehension, the process described in specification No. 1,519,880 as modified by the present invention is diagrammatically represented in the annexed drawing which forms part of this specification and requires no detailed description, but that the hatched rectangle 4 signifies the mother liquors referred to in the claims, and the hatched rectangles IX and X indicate the process steps to which such mother liquors are subjected according to the present invention. The optional step described in this specification, viz., of reintroducing the mother liquor substantially freed from iron into the main process and subjecting them to evaporation together with part of the original solution from 2 is indicated in the drawing by a dotted arrow.

In this connection it appears to be of particular advantage that the double decomposition according to the equation given need not be quantitative, as the iron impurities, when present only in small quantities, owing to the lower concentration as compared with the original solution, remain dissolved therein when the latter is evaporated.

*Example.*—1 cubic metre of a mother liquor containing in solution, in the form of respective metal chlorides 55 grams of ferric oxide $Fe_2O_3$ and 135 grams of alumina $Al_2O_3$ per liter is diluted with about 3 times its amount of water and 250 kilograms of ground calcined clay are added thereto. The mixture is heated while stirring. After separaration of the ferric oxide the refined solution still contains about two parts of $Fe_2O_3$ to 100 parts of alumina. This solution is then evaporated in the same manner as fresh extracting solution apart or together with the latter.

I claim:—

1. In the production of alumina by way of aluminum chloride obtained by extracting potter's earth or clay with hydrochloric acid and evaporating the solution to crystallization, the steps which comprise diluting the mother liquors resulting from the separation and washing of the magma of aluminum chloride crystals, removing iron therefrom as ferric oxide by treating the said liquors with aluminous material, and subjecting the resulting solution to evaporation.

2. In the production of alumina by way of aluminum chloride obtained by extracting potter's earth or clay with hydrochloric acid and evaporating the solution to crystallization, the steps which comprise diluting the mother liquors resulting from the separation and washing of the magma of aluminum chloride crystals, removing iron therefrom as ferric oxide by treating the said liquors with calcined potter's earth, and subjecting the resulting solution to evaporation.

In testimony whereof I, ANNA MARBURG, affix my signature, being administratrix of the estate of EDUARD C. MARBURG, deceased.

ANNA MARBURG.